United States Patent [19]

Hayward et al.

[11] 4,039,688

[45] Aug. 2, 1977

[54] CENTERFILLED FOOD BAR

[75] Inventors: James Roger Hayward, McHenry; William L. Keyser, East Dundee; Walter J. Zielinski, Ingleside, all of Ill.

[73] Assignee: The Quaker Oats Company, Chicago, Ill.

[21] Appl. No.: 654,370

[22] Filed: Feb. 2, 1976

[51] Int. Cl.² .......................... A23J 3/00; A23G 3/00; A23C 19/12

[52] U.S. Cl. ................................. 426/92; 426/103; 426/124; 426/571; 426/582; 426/656; 426/657; 426/516

[58] Field of Search ................. 426/72, 99, 92, 103, 426/316, 571, 582, 332, 656, 658, 810, 660, 657

[56] References Cited

U.S. PATENT DOCUMENTS

| | | | |
|---|---|---|---|
| 3,362,829 | 1/1968 | Landfried | 426/99 |
| 3,607,309 | 9/1971 | Olney et al. | 426/571 |
| 3,684,528 | 8/1972 | Batey | 426/571 |
| 3,741,774 | 6/1973 | Burkwall | 426/582 |
| 3,793,464 | 2/1974 | Rusch | 426/99 |
| 3,836,683 | 9/1974 | Hoos | 426/582 |

*Primary Examiner*—Jeanette M. Hunter
*Attorney, Agent, or Firm*—Charles J. Hunter

[57] ABSTRACT

A food bar having a high protein, flavored outer shell and an inner filling, the outer shell comprising protein supplemented marshmallow, and the inner filling comprising an intermediate moisture food product.

13 Claims, No Drawings

4,039,688

CENTERFILLED FOOD BAR

BACKGROUND OF THE INVENTION

1. Field of the Invention

This invention relates to a centerfilled food bar.

2. Description of the Prior Art

Centerfilled food products are well known to the industry. U.S. Pat. No. 3,541,946 and U.S. Pat. No. 3,764,715 teach processes using centerfilled food products. The processes used in producing those food products are also useful for production in this invention and are incorporated herein by reference. Prior centerfilled food products, however, as described in the above patents, have been those in which a cereal or otherwise hard outer core is extruded around a soft inner core. The resulting product is something having a hard shell with a soft inner filling and the two sides of the product, that is the outer shell and the inner filling have substantially different moisture contents and different nutritional and other characteristics.

Intermediate moisture food products have also been well known in the past. By use herein of the term "intermediate moisture food product" it is intended to mean a food product having a moisture content of between 15 and 45% by weight and being stable with respect to bacteriological spoilage. In U.S. Pat Nos. 3,741,774; 3,759,714; and 3,202,514, food products are shown each having an intermediate moisture content and illustrating different types of products. Other processes are now known which include the production of stabilized egg and other such foods as intermediate moisture food products. Additionally, jellies, jams and the like have been produced having intermediate moisture contents and being bacteriologically stable.

The new and novel product of this invention is a combination of a stabilized protein supplemented marshmallow, as an outer shell, with an inner shell comprising an intermediate moisture food product. The new and novel product of this invention is the first known process to give the high degree of taste required for inclusion of large amounts of protein in a food product.

SUMMARY OF THE INVENTION

It is an object of this invention to provide a food bar which is highly nutritious and good tasting.

It is an object of this invention to provide a combined stabilized, high protein, flavored food product.

It is a further object of this invention to provide a process for producing a new and novel food product having good taste.

The objects of this invention are accomplished by a high protein, flavored food product comprising an outer shell and an inner filling, said outer shell comprising marshmallow supplemented with protein having reduced water binding capability and said inner filling comprising an intermediate moisture food product having a moisture content between 15 and 45% by weight. Preferably, in the product, the outer shell and inner filling has substantially the same water activity coefficient, $A_w$, and the water activity coefficient of both is below 0.85. In preparing a protein supplemented marshmallow, it is desirable to supplement the marshmallow by adding thereto a heat treated protein or a fat coated protein or a combination of heat treated protein and fat coated protein. Said heat treated protein can be selected from the group consisting of animal protein, vegetable protein, casein, caseinate salts and combinations thereof. Said fat coated protein can be selected from the group consisting of animal protein, vegetable protein, casein, caseinate salts and combinations thereof.

Three types of intermediate moisture food products are particularly desirable for use in this invention. Shelf stable intermediate moisture meats are highly desirable. Shelf stable cheese, having a moisture content of approximately 35% by weight, is also desirable. Fruits, jams and jellies, made in an intermediate moisture range, that is, a moisture range between 15 and 45% by weight are also highly desirable. Depending upon the desire for consumption of each, the filling can be readily determined. The filling is not limited, however, to those above mentioned and may include other types of fillings well known within the food industry.

The objects of this invention are further accomplished by a combination including a high protein flavored food product comprising an outer shell and an inner filling, said outer shell comprising marshmallow supplemented with protein having reduced water binding capability, and said inner filling comprising an intermediate moisture food product; a hermetically sealed container completely encircling the marshmallow; a water converting catalyst within the confines of the container; and an atmosphere surrounding the food product in the container, said atmosphere comprising no more than about 4% by weight oxygen and the remainder of the atmosphere comprising an inert gas and sufficient hydrogen to combine with all the oxygen and convert it to water.

The objects of this invention are further accomplished by a process for making a unique high protein flavored food product, said process comprising:

A. preparing a marshmallow having therein a protein material having reduced water binding capability;

B. preparing an intermediate moisture food product having a moisture content and water activity coefficient near enough to the moisture content and water activity coefficient of the marshmallow so that when the two come into contact with each other, moisture will not diffuse from the intermediate moisture food product into the marshmallow or vice versa.

C. at least partially encircling the intermediate moisture food product with the marshmallow.

Preferably, in the above, the encircling of the intermediate moisture food product with a marshmallow is accomplished by simultaneously extruding the marshmallow and intermediate moisture food product with the marshmallow being extruded around the intermediate moisture food product. The product is then subdivided in its extruded state.

It may be desirable to subdivide the mixture by clamping the ends of the product to completely enclose the semi-moist or intermediate moisture food product within the other marshmallow exterior.

It is also desirable to provide an outer layer of marshmallow containing protein, then a layer of the intermediate moisture center and finally a second outer layer of marshmallow containing protein. The three layers are then cut into squares or rectangles with cross section showing on all four sides wherein the top and bottom layer is marshmallow.

Preferably also, the objects of this invention are accomplished by placing the product in a container along with a water converting catalyst; surrounding the product with an atmosphere containing no more than about 4% by weight oxygen, with said atmosphere being an inert gas with sufficient hydrogen therein to convert all the oxygen to water; and preventing additional oxygen from reaching the product.

In the process of this invention, it is preferable to prepare a marshmallow base by preparing a marshmallow mix, adding air to the marshmallow mix to get a density at atmospheric pressure of from 30-74 oz. per gallon, and reducing any pressure thereon to atmospheric pressure, adding a protein ingredient having reduced water binding capability, and allowing the marshmallow to set.

The well known processes for producing marshmallow are perfectly acceptable for use in this invention. In the instance where casein or caseinate salts are fat coated and then included within the marshmallow, it is preferable to include casein or caseinate salts which have been fat coated into the mix after the whipping thereof. If vegetable protein, such as oil seed vegetable protein, which has been concentrated is used as the protein supplement of the marshmallow, then it is preferable to fat coat this protein and include it after the marshmallow has been whipped or puffed by injection of air into it and after the pressure thereon is reduced to atmospheric pressure. After the protein is inserted into the marshmallow, the marshmallow is then coextruded or otherwise formed as a coating over an intermediate moisture food product.

It may be understood that the intermediate moisture food product is described herein is an intermediate moisture food product having a moisture content between 15% and 45% by weight as hereinbefore discussed. The product can be any of the intermediate moisture food products that are well known so long as the water activity coefficient of the intermediate moisture food product is below 0.85.

Marshmallow is an aerated food product usually composed of various saccharides, water, gelatin and flavoring agents. Although optional, marshmallow may also contain edible coloring and other minor edible ingredients such as edible humectants.

Marshmallow syrup is the mixture of ingredients that is aerated and whipped to form marshmallow. By use herein of the terms "marshmallow mix" and "marshmallow syrup", we intend to refer to a marshmallow syrup. Depending on the method for marshmallow production, marshmallow syrup usually has a moisture content of about 16-30% by weight, very little of which is lost in processing. A more detailed description of marshmallow syrup is found later on in this discussion.

Marshmallow syrup generally has a density of approximately 127 oz. per gallon. In the production of marshmallow, marshmallow syrup is whipped and intermixed with an inert, edible gas such as air or nitrogen until the density of the mixture is approximately 44 oz. per gallon. This volumetric expansion, i.e. volume increase of 2-3 times, gives marshmallow the characteristic spongy texture which consumers desire. In fact, these spongy and low-density texture characteristics are so common to marshmallow that consumers will not accept a product lacking in them.

Many different flavoring agents have been utilized to alter the taste of marshmallow. These flavoring agents have heretofore been required to have low fat contents and be used in such small quantities that the final marshmallow product has a very low fat content, i.e. usually below 1.0 percent by weight fat. This low fat content has been required in order to prevent excess fat from precluding expansion during whipping or aeration. Since the marshmallow foam is essentially a mixture of ingredients mixed with and whipped with water, very small quantities, i.e. above 1% by weight, of fats or oils have heretofore broken this foam preventing the required product expansion. This is obvious since oils or fats and water do not readily mix and thus would not be thought to be a combination which could be whipped. While some attempts have been made to increase the oil or fat level in marshmallow, these attempts have generally been through the addition of certain additives which prevent the oil from breaking the foam. While these attempts have met minor success in providing incremental increases in fat content, the additional additives have created an off-taste or foreign taste which has made the marshmallow product unacceptable.

A marshmallow mix for use in production herein includes various ingredients which as described above include various non-reducing saccharides, water, gelatin, and flavoring agents. By use of the term "gelatin" we intend to mean a glutinous material obtained from animal tissues by prolonged boiling or any of the various substances resembling gelatin in physical properties. Gelatin is sold on the basis of bloom test or jelly test and gelatin having a bloom test or jelly test of from 150-300 grams is normally considered acceptable for marshmallow production. It is usually preferred, however, to use from 1.5-2.5% by weight of a gelatin having a bloom test of from 225-250 grams with variations in bloom test values being compensated for by using less gelatin as the bloom test value increases.

By use herein of the term "marshmallow mix" it is intended to mean those mixed ingredients which are whipped and aerated to produce marshmallow. These include the marshmallow syrups known in the industry, and include by reference the description found in the Krohn and Polito patent, U.S. Pat. No. 3,556,812.

The process of this invention, when the requirement is for the mixing of air with the marshmallow mix until the atmospheric pressure density thereof is from about 30-74 oz. per gallon, is intended to mean those processes in which air can be injected or whipped into the marshmallow mix to give it the requisite density. For instance, the Oakes type gas injection system, as previously referred to, is prefectly acceptable. Additionally, the whipping of air by a simple wire mixer can be sufficient so long as sufficient air is included in the product to insure the requisite density. Additionally, other new types of marshmallow equipment well known in the industry are now capable of inserting or injecting sufficient amounts of air into the marshmallow while mixing it to provide at atmospheric pressure the requisite density. If the mixing is not at atmospheric pressure, then prior to the casting or setting thereof the pressure must be reduced until it is approximately atmospheric.

Marshmallow mixes that may be used in this invention are the normal marshmallow mixes well known in the marshmallow industry. Among the many formulas that are acceptable for marshmallow production are those found in the following: *Candy Making As A Science And Art*, by Claude D. Barnette, Don Guessel, Publications, Inc., New York, 1960, pp. 99-103 and *Encyclopedia of Candy and Ice Cream Making*, by Simon I. Leon, Chamical Publishing Co., New York, 1959, pp. 294-304; and *A Textbook on Candy Making*, by Alfred E. Leighton, Manufacturing Confectioners Publishing Co., Oak Park, Ill., 1952, pp. 55-68. A typical formula for use herein would include about 60-85% by weight sucrose, about 15–25% by weight water; about 2–5% by weight invert sugar; and about 1–4% by weight gelatin. The typical formula may also include some alterations of the formula such as replacing part or all sugars and syrups with non-reducing sugars and syrups. Various flavoring agents and humectants may also be added in minor amounts. Preferably in this invention, the marshmallow mix has about 80.1% by weight sugar, about 18.3% by weight water, about 1.2% by weight gelatin, and about 0.4% other ingredients such as flavoring, coloring, and preservatives.

It must be emphasized that the marshmallow base must be low, i.e. below 2% by weight, in reducing sugars or the effect on the protein will make the product unacceptable.

The outer shell portion of the product of this invention must include a high protein, i.e. above 30% protein, ingredient of reduced water binding capability. The high protein ingredient can be one of three types: (a) it can be a fat coated protein; (b) it can be a protein fortified cereal which has been heat treated to substantially reduce the water binding capability thereof; or (c) a combination of (a) and (b).

When fat coated casein or caseinate salts are used, they are coated with a vegetable oil or fat having a melting point below 120° F. The coating must be applied prior to inclusion of the casein in the product and cannot simply be mixed with a fat containing mixture to produce an acceptable product. Adding the coating material (fat or vegetable oil) and casein or caseinate salt as separate ingredients to the marshmallow mix will not result in a desirable product.

When cereal protein is used, it is heated to denature the protein therein until the water binding capacity of the protein ingredient is substantially reduced. Of course, the heating cannot be so severe that it destroys the protein efficiency ratio substantially. It has been found that a heating of 350° F. for ½ to 1½ minutes accomplishes this but other such times and temperatures that produce an equivalent result are acceptable and with one skilled in the art of heat treating protein materials.

The density of the final marshmallow product produced by this invention must be from 111–119 oz. per gallon at atmospheric pressure, and sufficient air must be inserted therein to produce this requisite density effect. When referring to density of the product, it is intended to refer to the density at atmospheric pressure, i.e., gas pressure removed, unless it is otherwise stated.

The product, once produced, may be additionally stabilized by inserting it into a container along with a water converting catalyst within the confines of the container and providing an atmosphere surrounding the food product in the container with the atmosphere comprising no more than about 4% by weight oxygen and the remainder of the atmosphere comprising an inert gas and sufficient hydrogen to combine with all the oxygen and convert it to water. Nitrogen has been found to be a highly acceptable inert atmosphere for inclusion with the hydrogen. The water converting catalyst can be any of the known catalysts that are inert with respect to the product and which are non-toxic when included in a food package. It has been found, for instance, that it is highly desirable to use a noble metal catalyst, including such things as palladium and platinum catalysts, which are well known to convert a mixture of oxygen and hydrogen to water. By use herein, then, of the term "water converting catalyst" is intended to mean any catalyst which is inert with respect to the food product and which can convert oxygen and hydrogen to water. The catalyst can be sandwiched between air permeable material, adhered to the container wall or to an insert placed therein or included in any such manner which will not contaminate the product.

After the hydrogen and oxygen are converted into water, the water may be retained in the container or absorbed into the semi-moist food product and marshmallow wherein it is stabilized, and since the amount thereof is so small, it does not have a harmful effect upon the product.

DESCRIPTION OF THE PREFERRED EMBODIMENTS

This invention may be more fully described but is not limited by the following examples.

EXAMPLE 1

A gelatin mix is prepared by adding 0.927 parts by weight gelatin (Bloom test strenght 250 grams) to a first jacketed kettle containing 8.2 parts by weight water. The gelatin is allowed to soak in the water for 5 minutes and then steam is introduced into the jacketed kettle until the temperature of the mixture is 145° F. While maintaining the mixture at 145° F. the mixture is stirred until all the gelatin is dissolved in the water. This mixture is referred to as the gelatin mix. The gelatin mix is then set aside for inclusion in the process.

A marshmallow premix is prepared in a second jacketed kettle. For the marshmallow premix, 8.3 parts by weight water, 0.067 parts by weight preservative, 77.2 parts by weight sucrose, 0.046 parts by weight flavoring (vanilla), and 0.21 parts by weight color are added to the jacketed kettle. These ingredients are then stirred until completely mixed. This mixture is referred to as a marshmallow premix. The marshmallow premix is then set aside for inclusion in the process.

A marshmallow mixture or marshmallow syrup is then prepared by adding the gelatin mix prepared in the first jacketed kettle to the marshmallow premix in the second jacketed kettle. The marshmallow mixture is then thoroughly mixed until the mixture is uniform throughout with regard to each of the ingredients. The ingredients are circulated through a heat exchanger and the temperature is reduced to about 75° F. and maintained constant at that temperature. The mixture is then introduced as a continuous stream into an Oakes continuous marshmallow mixer and beater (The E. T. Oakes Corporation, Islip, N.Y). The mixer is adjusted so that the aerated marshmallow mixture leaving the mixer is at a temperature of 85° F. plus or minus 3° F. Air is injected into the mixture and the flow rate and pressure of the air are adjusted until samples of the product exposed to atmospheric pressure have a density of about 45–55 oz. per gallon. Pressure of the aerated mixture leaving the mixer is found to fluctuate within the range of about 40–60 psig. The mixture is then introduced into the atmosphere whereupon it expands and has a density of about 50 oz. per gallon. Casein in an amount of 10 parts by weight is mixed with a vegetable fat to prevent swelling when casein comes in contact with $H_2O$ in the marshmallow mix. The casein is then thoroughly mixed with the aerated marshmallow mix.

An intermediate moisture cheese product produced in accordance with the example in U.S. Pat. No. 3,741,774 is produced. Next, the marshmallow and cheese are coextruded in accordance with the teachings of U.S. Pat. No. 3,541,946. The resulting product is marshmallow coated, semi-moist cheese which is good in taste, high in quality, and has a high protein content.

EXAMPLE 2

Example 1 is repeated with the exception that the filling is jelly having a moisture content of approximately 40% by weight. The resulting product again is a good tasting, exceptionally nutritious product.

EXAMPLE 3

Example 1 is repeated except that after the product is produced it is placed in a bag along with a palladium catalyst. The palladium catalyst is sandwiched between two layers of polyethylene which are permeable to the air or atmosphere sufficient to allow the air-atmosphere to pass therethrough. The bag is then flushed with a mixture containing 1 part by weight hydrogen and 4 parts by weight nitrogen. After a double flushing with this gas, the mixture is then sealed in the container to prevent further oxygen from entering the bag. After a period of time, the product is found to have high quality and good taste and the vitamins and proteins added thereto are found to have been very stable.

EXAMPLE 4

Example 2 is repeated with the conditions defined in Example 3.

It may thus be seen that the new and novel product of this invention provides a new and novel food bar which is good in taste and which has high nutritional qualities by combining fortified proteinaceous marshmallow with high protein inner fillings and flavorful inner fillings. The result is a product that has heretofore been totally unknown within the food industry. The product is high in quality, high in texture, and exceptional in taste. While centerfilled food products are old, the embodiment of centerfilling using a protein fortified marshmallow outer layer has never been shown before.

Having fully described this new and unique invention, the following is claimed:

1. A high protein flavored food product comprising: an outer shell; and an inner filling; said outer shell comprising marshmallow supplemented with a high protein ingredient having reduced water binding capability and being selected from the group consisting of heat treated protein, fat coated protein and combinations thereof, said high protein ingredient having a protein content of at least 30% by weight, said protein supplemented marshmallow having a density between 111-119 oz. per gallon, said marshmallow being below 2% by weight in reducing sugars; said inner filling comprising an intermediate moisture food product having a moisture content between 15 and 45% by weight, and a water activity coefficient below 0.85.

2. A high protein food product as in claim 1 wherein the outer shell and inner filling have substantially the same water activity coefficient, $A_w$, and wherein the water activity coefficient of both is below 0.85.

3. A high protein food product as in claim 1 wherein the heat treated protein is selected from the group consisting of animal protein, vegetable protein, casein, caseinate salts and combinations thereof; and the fat coated protein is selected from the group consisting of animal protein, vegetable protein, casein, caseinate salts and combinations thereof.

4. A high protein food product as in claim 1 wherein the inner filling is a shelf stable, intermediate moisture fruit product.

5. A high protein food product as in claim 1 wherein the inner filling is intermediate moisture, shelf stable cheese.

6. A high protein food product as in claim 1 wherein the inner filling is intermediate moisture, shelf stable meat.

7. In combination:
A. a high protein flavored food product comprising an outer shell and an inner filling, said outer shell comprising marshmallow supplemented with a high protein ingredient having reduced water binding capability selected from the group consisting of heat treated protein, fat coated protein and combinations thereof, said high protein ingredient having a protein content of at least 30% by weight, said protein supplemented marshmallow having a density between 111-119 oz. per gallon, said marshmallow being below 2% by weight in reducing sugars; said inner filling comprising an intermediate moisture food product having a water activity coefficient below 0.85;
B. a hermetically sealed container completely encircling the high protein flavored food product;
C. a water converting catalyst within the confines of the container; and
D. an atmosphere surrounding the food product in the container, said atmosphere comprising no more than about 4% by weight oxygen and the remainder of the atmosphere comprising an inert gas and sufficient hydrogen to combine with all the oxygen and convert it to water.

8. A process for making a unique high protein flavored food product, said process comprising:
A. preparing a marshmallow having therein a protein material having reduced water building capability selected from the group consisting of heat treated protein, fat coated protein and combinations thereof, said protein material having a protein content of at least 30% by weight, said protein supplemented marshmallow having a density between 111-119 oz. per gallon, said marshmallow being below 2% by weight in reducing sugars;
B. preparing an intermediate moisture food product having a moisture content and water activity coefficient near enough to the moisture content and water activity coefficient of the marshmallow so that when the two come into contact with each other, moisture will not diffuse from the intermediate moisture food product into the marshmallow or vice versa; and
C. at least partially encircling the intermediate moisture food product with the marshmallow.

9. A process as in claim 7 wherein the encircling of the intermediate moisture food product with the marshmallow comprises: simultaneously extruding the marshmallow around the intermediate moisture food product; and subdividing the simultaneously extruded mass.

10. A process as in claim 8 wherein the subdividing of the product also clamps the ends of the product to completely enclose the centerfilling.

11. A process as in claim 8 also including placing the product in a container along with a water converting catalyst, surrounding the product with an atmosphere containing no more than about 4% by weight oxygen, with said atmosphere being an inert gas with sufficient hydrogen therein to convert substantially all the free oxygen therein to water; and preventing additional oxygen from reaching the product.

12. A process as in claim 8 wherein the preparing of the supplemented marshmallow comprises: preparing a marshmallow mix; adding air to the marshmallow mix to get a density at atmospheric pressure of from 30–74 oz. per gallon, reducing any pressure thereon to atmospheric pressure; adding fat coated casein thereto; and allowing the marshmallow to set.

13. A process as in claim 8 wherein the preparing of the supplemented marshmallow comprises: preparing a marshmallow mix; mixing air therewith to get a density at atmospheric pressure of from 30–74 oz. per gallon; reducing any pressure thereon to atmospheric pressure; adding a heat treated vegetable protein material having a protein content of at least 30% by weight thereto while maintaining the density of the final marshmallow product between 111–119 oz. per gallon; and allowing the marshmallow to set.

* * * * *

UNITED STATES PATENT OFFICE
CERTIFICATE OF CORRECTION

PATENT NO. : 4,039,688
DATED : August 2, 1977
INVENTOR(S) : James R. Hayward, William L. Keyser & Walter J. Zielinski It is certified that error appears in the above-identified patent and that said Letters Patent are hereby corrected as shown below:

Claim 8, Column 8, Line 4, "building" should read

--binding--.

Signed and Sealed this

Sixth Day of June 1978

[SEAL]

Attest:

RUTH C. MASON
Attesting Officer

DONALD W. BANNER
Commissioner of Patents and Trademarks